US011550521B2

(12) United States Patent
Takao

(10) Patent No.: US 11,550,521 B2
(45) Date of Patent: Jan. 10, 2023

(54) PRINTING APPARATUS

(71) Applicant: BROTHER KOGYO KABUSHIKI KAISHA, Nagoya (JP)

(72) Inventor: Yoshihiro Takao, Anjo (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/679,435

(22) Filed: Feb. 24, 2022

(65) Prior Publication Data

US 2022/0269461 A1 Aug. 25, 2022

(30) Foreign Application Priority Data

Feb. 25, 2021 (JP) .............................. JP2021-028955

(51) Int. Cl.
*G06F 3/12* (2006.01)

(52) U.S. Cl.
CPC .......... *G06F 3/1251* (2013.01); *G06F 3/1204* (2013.01); *G06F 3/1253* (2013.01)

(58) Field of Classification Search
CPC ..... G06F 3/1251; G06F 3/1204; G06F 3/1253
USPC ........................................................ 358/1.15
See application file for complete search history.

(56) References Cited

U.S. PATENT DOCUMENTS

| 6,297,887 B1 | 10/2001 | Yamauchi |
| 6,483,603 B1* | 11/2002 | Yonenaga ............ G03G 15/602 |
| | | 358/1.12 |
| 2019/0311233 A1* | 10/2019 | Kouguchi ................ B41J 11/46 |
| 2020/0021705 A1* | 1/2020 | Yasui ................... H04N 1/3873 |

FOREIGN PATENT DOCUMENTS

| JP | H09-58090 A | 3/1997 |
| JP | H09-193480 A | 7/1997 |
| JP | H11-28849 A | 2/1999 |
| JP | 2000-229451 A | 8/2000 |
| JP | 2003-104600 A | 4/2003 |
| JP | 2007-276144 A | 10/2007 |

* cited by examiner

*Primary Examiner* — Allen H Nguyen
(74) *Attorney, Agent, or Firm* — Kenealy Vaidya LLP

(57) ABSTRACT

A printing apparatus includes a conveying mechanism configured to convey a continuously-fed paper, a print head, a memory, and a controller. The controller obtains printing information including a plurality of pieces of the unit-image data, pitch information, and speed information of a continuously-fed paper. The controller determines a first period of time which is required to print a predetermined number of unit-images on the continuously-fed paper and a second period of time which is required to store the predetermined number of pieces of the unit-image data into the memory. The controller determines, based on the first period of time and the second period of time, a stored-number which is a number of pieces of the unit-image data to be stored into the memory and starts printing the plurality of unit-images when the stored-number of pieces of the unit-image data is stored into the memory.

7 Claims, 6 Drawing Sheets

FIG.5

254 EEPROM

2541

| EASE OF TEARING | | QUALITY OF PAPER | | |
|---|---|---|---|---|
| | | SOFT | NORMAL | HARD |
| WIDTH W1 | < FIRST VALUE | EASY-TO-TEAR | NORMAL | NORMAL |
| | < SECOND VALUE | EASY-TO-TEAR | NORMAL | HARD-TO-TEAR |
| | ≥ SECOND VALUE | EASY-TO-TEAR | HARD-TO-TEAR | HARD-TO-TEAR |

2542

| SECOND CANDIDATE VALUE PT12 | | FPOT PROPRITY | | |
|---|---|---|---|---|
| | | HIGH | MIDDLE | LOW |
| EASE OF TEARING | EASY-TO-TEAR | THIRD VALUE | FIRST VALUE | FIRST VALUE |
| | NORMAL | SECOND VALUE | THIRD VALUE | FIRST VALUE |
| | HARD-TO-TEAR | SECOND VALUE | SECOND VALUE | THIRD VALUE |

2543

| STORED-NUMBER N0 | | PROVISIONAL TARGET NUMBER OF SHEETS PT1 | | | | | |
|---|---|---|---|---|---|---|---|
| | | 100 | ⋯ | 300 | ⋯ | 500 | ⋯ |
| DELAY RATE D1 (%) | 1 | 2 | : | 4 | : | 6 | |
| | 2 | 3 | : | 7 | : | 11 | : |
| | 3 | 4 | : | 13 | : | 15 | : |
| | : | : | : | : | : | : | : |
| | 10 | 11 | . | 33 | . | 50 | . |
| | 11 | 11 | : | 36 | : | 55 | : |
| | : | : | : | : | : | : | : |
| | 20 | 20 | : | 60 | : | 100 | : |
| | : | : | : | : | : | : | : |
| | 30 | 30 | : | 90 | : | 150 | : |
| | : | . | : | . | : | . | : |
| | 100 | 100 | : | 300 | : | 500 | : |

PRINTING APPARATUS

CROSS REFERENCE TO RELATED APPLICATION

The present application claims priority from Japanese Patent Application No. 2021-028955, which was filed on Feb. 25, 2021, the disclosure of which is herein incorporated by reference in its entirety.

BACKGROUND

The following disclosure relates to a printing apparatus.

There has been known a conventional printing apparatus in which a receiving speed which is a speed of receiving image data transmitted from an external device is measured. In a case where the measured receiving speed is less than a printing speed, printing is kept on waiting until a predetermined amount of image data is accumulated.

SUMMARY

There are printing apparatuses which execute printing for a plurality of images at high speed on a continuously-fed paper. In these printing apparatuses, it is necessary to return the continuously-fed paper to a start position so as to restart the printing when the printing is stopped. Moreover, the stopping of printing or the returning to the start position places a load on the continuously-fed paper.

An aspect of the disclosure relates to a printing apparatus capable of suppressing the stopping of printing.

In one aspect of the disclosure, a printing apparatus includes a conveying mechanism configured to convey a continuously-fed paper in a conveying direction, a print head, a memory, and a controller. The controller is configured to obtain printing information including a plurality of pieces of the unit-image data, pitch information indicating a plurality of pitches, along the conveying direction, of a plurality of unit-images respectively corresponding to the plurality of pieces of the unit-image data printed on the continuously-fed paper, speed information indicating a speed of the continuously-fed paper conveyed by the conveying mechanism, store the plurality of pieces of the unit-image data into the memory, determine, based on the pitch information and the speed information, a first period of time required to print a predetermined number of unit-images on the continuously-fed paper, determine a second period of time required to store the predetermined number of pieces of the unit-image data respectively corresponding to the predetermined number of unit-images into the memory, determine, based on the first period of time and the second period of time, a stored-number which is a number of pieces of the unit-image data to be stored into the memory, and start printing the plurality of unit-images on the continuously-fed paper based on the plurality of pieces of the unit-image data stored in the memory when the stored-number of pieces of the unit-image data is stored into the memory.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 5 is tables stored in an EEPROM; and

EMBODIMENTS

Figure 1:
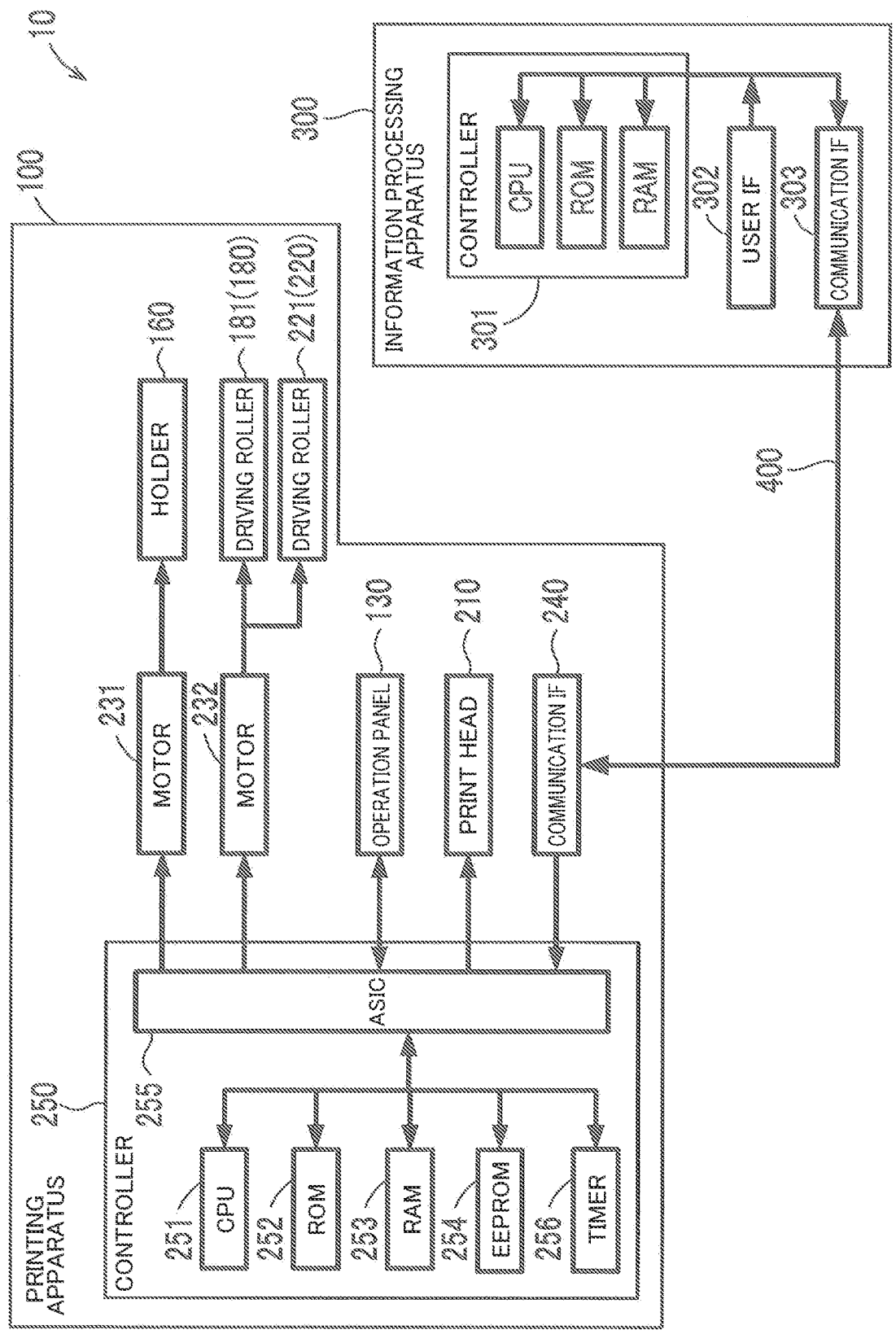
FIG. 1 is a block diagram illustrating a printing system.

There will be described a printing apparatus 100 and a printing system 10 including the printing apparatus 100 according to embodiments of this disclosure in detail. It is noted that it is to be understood that the disclosure is not limited to the details of the illustrated embodiment, but may be embodied with various changes and modifications, which may occur to those skilled in the art, without departing from the spirit and scope of the disclosure.

Definition of Wordings

In the following description, a movement directed from a start point toward an end point of an arrow is represented as a direction, and movements between a start point and an end point of an arrow are represented as directions.

With reference to a situation in which the printing apparatus 100 is placed so as to be usable (a situation in FIG. 2A), up and down directions 7 are defined, front and rear directions 8 are defined so that a side on which the discharging outlet 120 is provided becomes a near side (a front surface 111), and left and right directions 9 are defined by viewing the printing apparatus 100 from the near side (the front surface 111). In the following description, in a case where the start point and the end point are not specified, the up and down directions 7 will be referred to as the up and down direction 7. Similarly, the front and rear directions 8 will be referred to as the front and rear direction 8, and the left and right directions 9 will be referred to as the left and right direction 9.

Overall Configuration of Printing System

In FIG. 1, the printing system 10 includes the printing apparatus 100 and an information processing apparatus 300. The printing apparatus 100 and the information processing apparatus 300 are capable of data communication through a data transmission path 400. The data transmission path 400 is a communication network consists of a wired local-area network (LAN), a wireless LAN, a wide area network (WAN) itself, or combinations of these networks. Alternatively, the data transmission path 400 may be communication cables such as a USB cable. It is noted that the printing apparatus 100 may be configured so that the printing apparatus 100 can receive at least transmitted data from the information processing apparatus 300.

External Appearance of Printing Apparatus

In FIG. 2, the printing apparatus 100 is a label printer, and the printing apparatus 100 is used in a state in which the printing apparatus 100 is placed on a desk, a floor, rack or the like. The printing apparatus 100 records images on a continuously-fed paper S by ink-jet recording method.

Continuously-Fed Paper

Figure 2A:
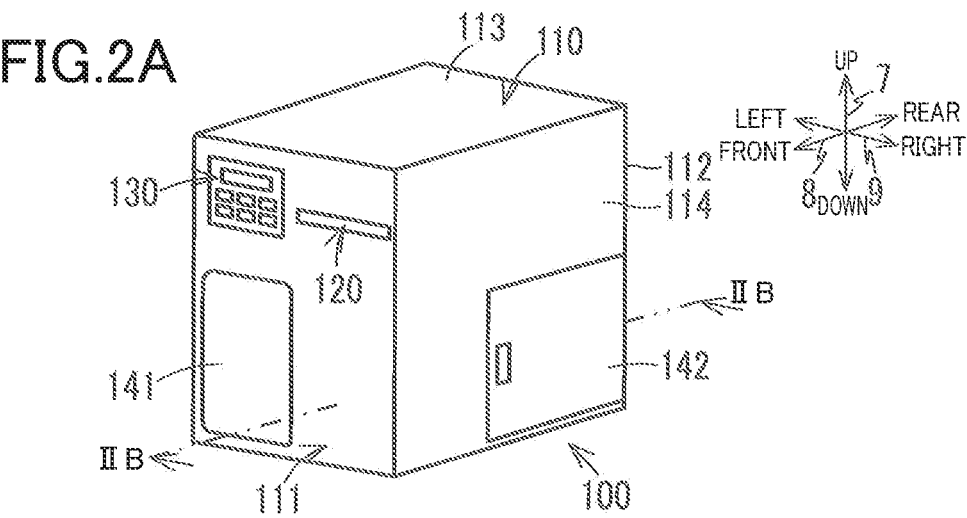
FIG. 2A is a perspective view schematically illustrating an external appearance of a printing apparatus.
Figure 2B:
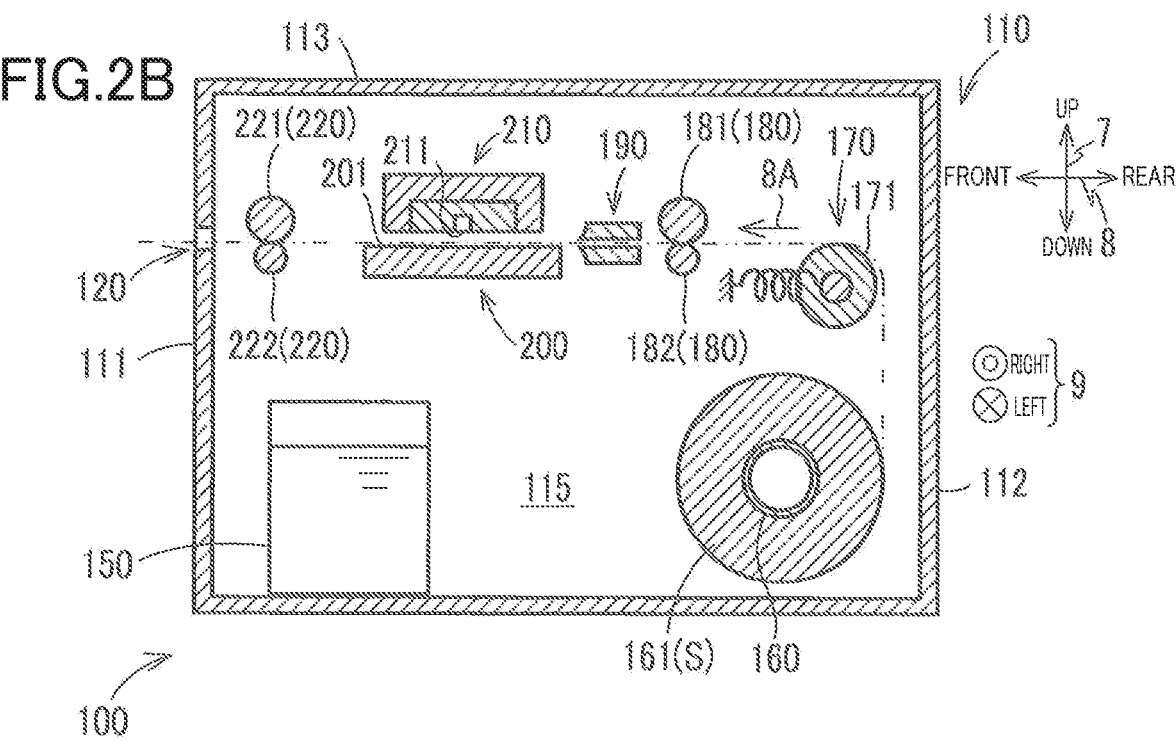
FIG. 2B is a schematically cross-sectional view of the printing apparatus taken along line IIB-IIB in FIG. 2A viewed from a right side.
Figure 2C:
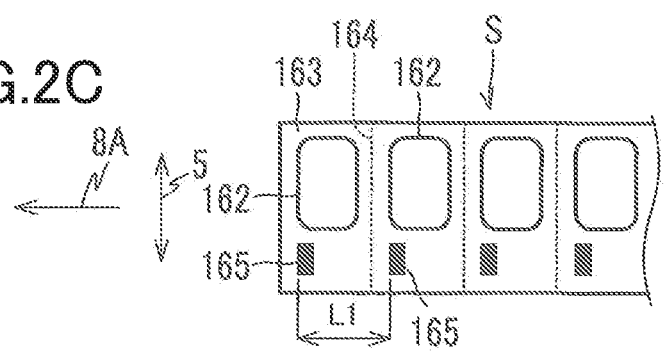
FIG. 2C is a schematic view illustrating a configuration of a continuously-fed paper.

In FIG. 2B, the continuously-fed paper S is a roll paper constituting a roll body 161. As illustrated in FIG. 2C, in the continuously-fed paper S, a plurality of label sheets 162 are disposed on a separator 163 along a conveying direction 8A with a space between two adjacent label sheets 162. In a case where the roll body 161 is unused, the roll body 161 includes, for example, a maximum 6000 label sheets 162. Each of the label sheets 162 has a substantially rectangular shape in plan view, the same as each other. Each of the label sheets 162 has a height H1 in the conveying direction 8A and has a width W1 in a width direction 5 orthogonal to the conveying direction 8A. Each of the label sheets 162 is stuck on the separator 163 by an adhesive. On the separator 163, a perforation 164 extending along the width direction 5 is formed between two label sheets 162 respectively adjacent to each other in the conveying direction 8A. A plurality of black marks 165 are respectively printed on the separator 163 so as to be adjacent to the plurality of label sheets 162 in the width directions 5. Each of the black marks 165 is a mark indicating a leading position of a corresponding one of the plurality of label sheets 162. Distances L1 between the leading positions of the two of the plurality of black marks 165 adjacent to each other in the conveying direction 8A, namely pitches between the leading positions of the two of the plurality of black marks 165, are the same as each other.

It is noted that the continuously-fed paper S may be a long sheet or a long nonwoven fabric constituting the roll body 161. The perforation 164 may not be formed on the continuously-fed paper S. The continuously-fed paper S may be a label roll paper such as a die-cut sheet or a half-cut sheet, and may be a fanfold paper.

In FIG. 2A, the printing apparatus 100 includes a housing 110 having a substantially parallel-piped shape. The housing 110 defines an internal space 115 of the housing 110 from an outside of the housing (see FIG. 2B). In the housing 110, the discharging outlet 120 is located at a right-upper part of the front surface 111. The discharging outlet 120 is a slot having a slit-like shape in the left and right direction 9. The continuously-fed paper S on which the image is printed is discharged through the discharging outlet 120.

Additionally, an operation panel 130 and a front cover 141 are provided on the front surface 111. A user inputs operations for operating the printing apparatus 100 and for setting various settings by the operation panel 130. A tank 150 located in the internal space 115 is exposed or covered by opening or closing the front cover 141 (see FIG. 2B and the like).

Internal Configuration of Printing Apparatus

In FIG. 2B, the printing apparatus 100 includes a holder 160, a tensioner 170, a conveying roller pair 180, a guide member 190, a platen 200, a print head 210, and a discharging roller pair 220 in the internal space 115.

As illustrated in FIG. 1, the printing apparatus 100 further includes a motor 231, a motor 232, a communication interface 240, and a controller 250.

Holder

In FIG. 2B, the holder 160 is located near a rear lower part of the internal space 115, and the roll body 161 is mountable on the holder 160. The holder 160 rotates in a circumferential direction around a rotation axis extending in the left and right direction 9 by driving force generated by the motor 231 (see FIG. 1) under control of the controller 250.

An axis of the roll body 161 is substantially coincide with the rotation axis of the holder 160 when the roll body 161 is mounted on the holder 160. The roll body 161 is positioned in the left and right direction 9 by a guide member, which is not illustrated. The roll body 161 rotates in accordance with the rotation of the holder 160. The continuously-fed paper S is conveyed upward from a rear end of the roll body 161 by the rotation of the holder 160 and the like, and the continuously-fed paper S is conveyed to the tensioner 170. It is noted that, at this time, the holder 160 rotates in a counterclockwise direction when viewed from a right side of the housing 110.

A right cover 142 which is openable and closable is provided on a right surface 114 of the housing 110 (see FIG. 2A). The holder 160 and the like located in the internal space 115 are exposed to the outside of the housing 110 or covered from the outside by opening or closing the right cover 142.

Tensioner

In FIG. 2B, the tensioner 170 is located at a position near a rear surface 112 and an upper surface 113 in the internal space 115. The tensioner 170 is located almost right above the holder 160. It is noted that a partition wall, which is not illustrated, is provided between the tensioner 170 and the holder 160. It is possible to prevent ink droplets dropped from the print head 210 from attaching to the roll body 161 by the partition wall.

The tensioner 170 includes a curved portion 171. The curved portion 171 has a curved shaped surface curving toward a rear upper part of the housing 110. A length of the curved portion 171 in the left and right direction is greater than a length of the roll body 161 in the left and right direction. An upper end position of the curved portion 171 is substantially the same as a position of a supporting surface 201 of the platen 200 in the up and down direction 7.

The continuously-fed paper S fed toward upward from the roll body 161 is wound around the curved portion 171. The continuously-fed paper S is in contact with a rear end of the curved portion 171 or slightly lower portion of the curved portion 171 than the rear end, and extends along the curved portion 171 toward the conveying direction 8A. The conveying direction 8A is a forward direction in the present embodiment. The front and rear direction 8 is an example of the conveying direction. The curved portion 171 is urged rearward by a spring or the like, accordingly, the tensioner 170 applies tension to the continuously-fed paper S.

Conveying Roller Pair and Discharging Roller Pair

The conveying roller pair 180 is located in front of the tensioner 170 and includes a driving roller 181 and a pinch roller 182. The driving roller 181 and the pinch roller 182 extend along the left and right direction 9. The driving roller 181 and the pinch roller 182 are in contact with each other in the up and down direction 7 at a position substantially the same as an upper end of the curved portion 171.

The discharging roller pair 220 is located in front of the conveying roller pair 180 and at a rear of the discharging outlet 120. The discharging roller pair 220 includes a driving roller 221 and a plurality of spurs 222. The driving roller 221 extends along the left and right direction 9. The plurality of spurs 222 are arranged so as to be spaced apart from each other in the left and right direction 9. The driving roller 221 and the plurality of spurs 222 are in contact with one another in the up and down direction 7 at a position substantially the same as an upper end of the curved portion 171 in the up and down direction 7.

Drive force generated by the motor 232 (see FIG. 1) under control of the controller 250 is transmitted to the driving rollers 181, 221. The driving rollers 181, 221 rotate, by the driving force, in a circumferential direction of rotation axes of the driving rollers 181, 221 each extending in a direction parallel to the left and right direction 9.

Guide Member

The guide member 190 is located between the tensioner 170 and the platen 200 in the front and rear direction 8. The guide member 190 comes into contact, from a left side and a right side, with the continuously-fed paper S extending forward from the tensioner 170 so as to position the continuously-fed paper S in the left and right direction 9. Accordingly, it is possible to guide the continuously-fed paper S frontward in a direction parallel to the conveying direction 8A toward the platen 200 by the guide member 190.

Platen

The platen 200 is located in front of the guide member 190 and a rear of the discharging roller pair 220. An upper surface of the platen 200 extends in the front and rear direction and the left and right direction, and the upper surface of the platen 200 is the supporting surface 201 supporting the continuously-fed paper S.

Print Head

The print head 210 is a line head and is located at a position upper than the supporting surface 201 in the up and down direction 7. The print head 210 is located so as to overlap the supporting surface 201 in the front and rear direction 8. In other words, the print head 210 is located so as to overlap the supporting surface 201 when viewed in the up and down direction. The print head 210 is disposed so as to cross over the supporting surface 201 in the left and right direction.

A plurality of nozzles 211 are arranged in a row extending the left and right directions 9 on a lower surface of the print head 210. The print head 210 ejects ink droplets from the plurality of nozzles 211 under control of the controller 250 (see FIG. 1). It is noted that, in FIG. 1, only a single nozzle 211 of the plurality of nozzles 211. Moreover, two or more rows of the nozzles 211 spaced apart from one another in the front and rear direction 8 may be arranged on the lower surface of the print head 210.

The tank 150 stores ink. The ink is liquid containing pigments and the like. The ink has suitable viscosity capable of dispersing the pigments uniformly. Colors of the ink are based on the pigments. The ink is supplied from the tank 150 to the print head 210 through a tube, which is not illustrated.

Communication Interface

In FIG. 1, the communication interface 240 receives transmission data transmitted from the information processing apparatus 300 through the data transmission path 400. The communication interface 240 transmits the received data to a RAM 253 through an ASIC 255 under control of the controller 250. In the following description, the expression "interface" will be referred to as "IF".

Controller

In FIG. 1, the controller 250 includes, as main configurations, a CPU 251, a ROM 252, the RAM 253, an EEPROM 254, the ASIC 255, and a timer 256. The main configurations are connected so as to be communicatable with one another by an internal bus. A controlling program of the printing apparatus 100 and the like are stored in the ROM 252. The CPU 251 executes the controlling program by using the RAM 253 and the EEPROM 254.

A part of a memory area of the RAM 253 is used as an image buffer 2531 (see FIG. 6). The image buffer 2531 temporary stores a plurality of pieces of the unit-image data 601 (see FIG. 3A). In the present embodiment, a size of the image buffer 2531 is a size B1.

The ASIC 255 is electrically connected to each of the motor 231, the motor 232, the print head 210, and the communication IF 240. The ASIC 255 respectively generates and outputs control signals for controlling rotations of the motor 231 and the motor 232.

The timer 256 starts clocking in accordance with an instruction from the CPU 251, and responds a period of time elapsed from reception of the instruction to the CPU 251. The timer 256 may be an independent IC, and may be integrated in the CPU 251.

It is noted that the controller 250 may be configured so that only the CPU executes various processes, only the ASIC or gate arrays execute various processes, or the CPU executes various processes in collaboration with either the ASIC or the gate arrays. Moreover, the controller 250 may be configured so that the single CPU executes various processes, a plurality of CPUs execute various processes, or a plurality of CPUs share execution of various processes. Moreover, the controller 250 may be configured so that a single ASIC or a single gate array executes various processed, or a plurality of ASICs and a plurality of gate arrays share execution of various processes.

Information Processing Apparatus

In FIG. 1, the information processing apparatus 300 is, for example, a PC, a smart phone, or a tablet-type device, and the information processing apparatus 300 includes a controller 301, a user IF 302 and a communication IF 303. It is noted that configurations of the controller 301 and the communication IF 303 are the same as configurations of the controller 250 and the communication IF 240, accordingly, explanations of the configurations of the controller 301 and the user IF 302 are dispensed with.

The user IF 302 includes a display, a mouse, and the like. The display is a liquid crystal display and the like, and displays various pieces of information based on image data transmitted from the controller 301. The mouse is operated by a user.

The controller 301, the user IF 302 and the communication IF 303 are connected so as to be communicatable with one another by an internal bus.

Operations of Printing System

There will be described below operations of the information processing apparatus 300 and the printing apparatus 100 with reference to FIG. 1 to FIG. 6 when the printing apparatus 100 prints label images on the label sheets 162 based on printing information 600 (see FIG. 3A) transmitted from the information processing apparatus 300.

Processes of Information Processing Apparatus

Figure 3A:
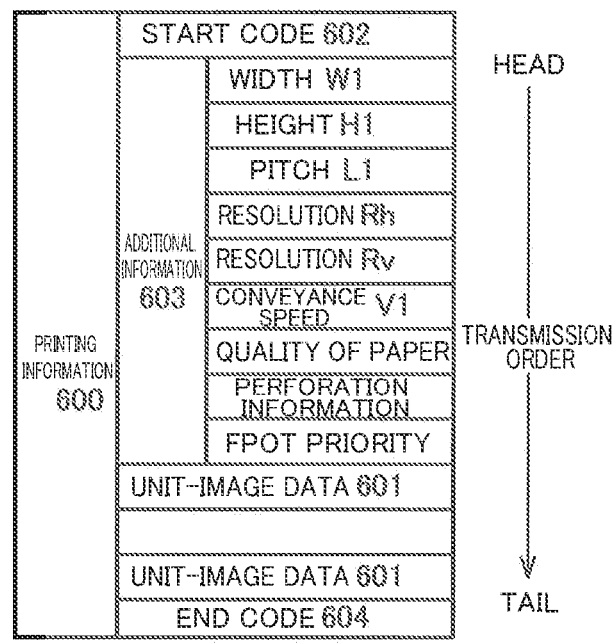
FIG. 3A is a schematic view illustrating a data-configuration of printing information.
Figure 3B:
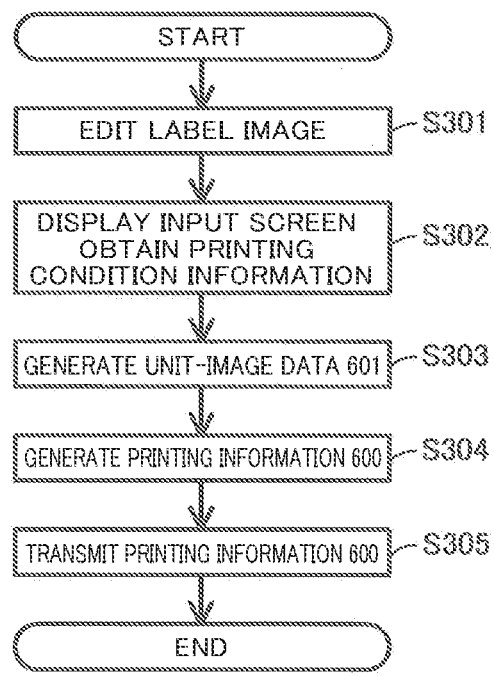
FIG. 3B is a flowchart representing a procedure of processes of an information processing apparatus.

The CPU 251 of the information processing apparatus 300 executes S301 to S305 in FIG. 3B by executing an editing program stored in the ROM 252.

At S301, the controller 301 edits, in the printing apparatus 100, a plurality of label images, which is to be processed by a printing process, in accordance with user operations through the user IF 302. The controller 301 generates the plurality of pieces of the unit-image data 601 (see FIG. 3A) respectively indicating the plurality of edited label images in RAM or the like.

The plurality of label images includes, for example, information indicating a name, a content, a category and the like of an object on which the printed label sheets 162 are stuck (for example, an item or the like on which the printed label sheets 162 are stuck). Each of the plurality of label images may include a one-dimensional code, a two-dimensional code and the like each coded based on the above described information in addition to the above described information. Each of the plurality of label images may include only a one-dimensional code or a two-dimensional code.

At S302, the controller 301 displays an input screen of a printing condition for printing the plurality of label images on the display. The user designates a necessary printing condition by operating the mouse or the like while referring to the display. At S302, the controller 301 further obtains information indicating the printing condition designated by the user based on received data from the mouse or the like. In the present embodiment, the printing condition includes the width W1, the height H1, a pitch L1, resolutions Rh, Rv, of the plurality of label image, a conveyance speed V1, a quality of paper of the continuously-fed paper S, an existence or nonexistence of the perforation on the continuously-fed paper S, and a FPOT priority. The quality of paper of the continuously-fed paper S and the existence or nonexistence of the perforation correspond to medium information related to the continuously-fed paper S.

The resolutions Rh, Rv are numbers of dots per unit length in the width direction 5 and the conveying direction 8A.

The conveyance speed V1 is a conveyance speed at which the continuously-fed paper S is conveyed in the conveying direction 8A by the conveying roller pair 180 and the discharging roller pair 220. It is noted that in a case where the printing apparatus 100 is not capable of handling a plurality of conveyance speeds V1, the conveyance speed V1 may not be included in the printing condition. In a case where the printing apparatus 100 is capable of two kinds of conveyance speeds V1, the conveyance speed V1 is "high speed" (for example, 700 mm/sec) or "low speed" (for example, 400 mm/sec).

The quality of paper of the continuously-fed paper S is "soft", "normal" or "hard".

The FPOT priority is an abbreviation of First Print Out Time. The FPOT priority is "high", "middle" or "low". At this time, the FPOT priority becoming "high" indicates that the user wishes shorter FPOT. In other words, the more the FPOT priority becomes "high", a period of FPOT becomes short.

At S303, the controller 301 executes a generating process. In the generating process, the controller 301 generates the plurality of pieces of the unit-image data 601 indicating the plurality of label images edited at S302. Each of the plurality of pieces of the unit-image data 601 is, for example, bitmap data, and indicates the label image by pixel values of coordinates specified in the conveying direction 8A and the width direction 5. Each of the pixel values is represented by the same number of bits. It is noted that S303 may be executed between S301 and S304.

At S304, the controller 301 generates printing information 600 illustrated in FIG. 3A. More specifically, the printing information 600 includes a start code 602 of the printing information 600, additional information 603, the plurality of pieces of the unit-image data 601 generated at S301, and an end code 604 of the printing information 600. The additional information 603 is fixed-length and includes information indicating information of each of the above described printing conditions.

At S305, the controller 301 transmits the start code 602, the additional information 603, the plurality of pieces of the unit-image data 601 generated at S304, and the end code 604 in this order as the printing information 600 from the communication IF 303 to the data transmission path 400.

Printing Process of Printing Apparatus

In the present embodiment, the printing apparatus 100 executes two kinds of the printing processes. A first kind of the printing process is an immediate-printing process, and a second kind of the printing process is an accumulating-printing process. The immediate-printing process is executed at S417 in FIG. 4, and is the printing process in which the printing apparatus 100 executes based on the printing information 600 without waiting accumulation of a stored-number N0 of the plurality of pieces of the unit-image data 601 in the image buffer 2531 (see S415, S418). The accumulating-printing process is executed at S419 in FIG. 4, and is the printing process in which the printing apparatus 100 executes based on the printing information 600 after waiting accumulation of the stored-number N0 of the plurality of pieces of the unit-image data 601 in the image buffer 2531.

In the printing apparatus 100, the CPU 251 executes a controlling program stored in a ROM and the like. When a data reception at the communication IF 240 is started, the CPU 251 controls transmission of the received data to the RAM 253.

Figure 4:
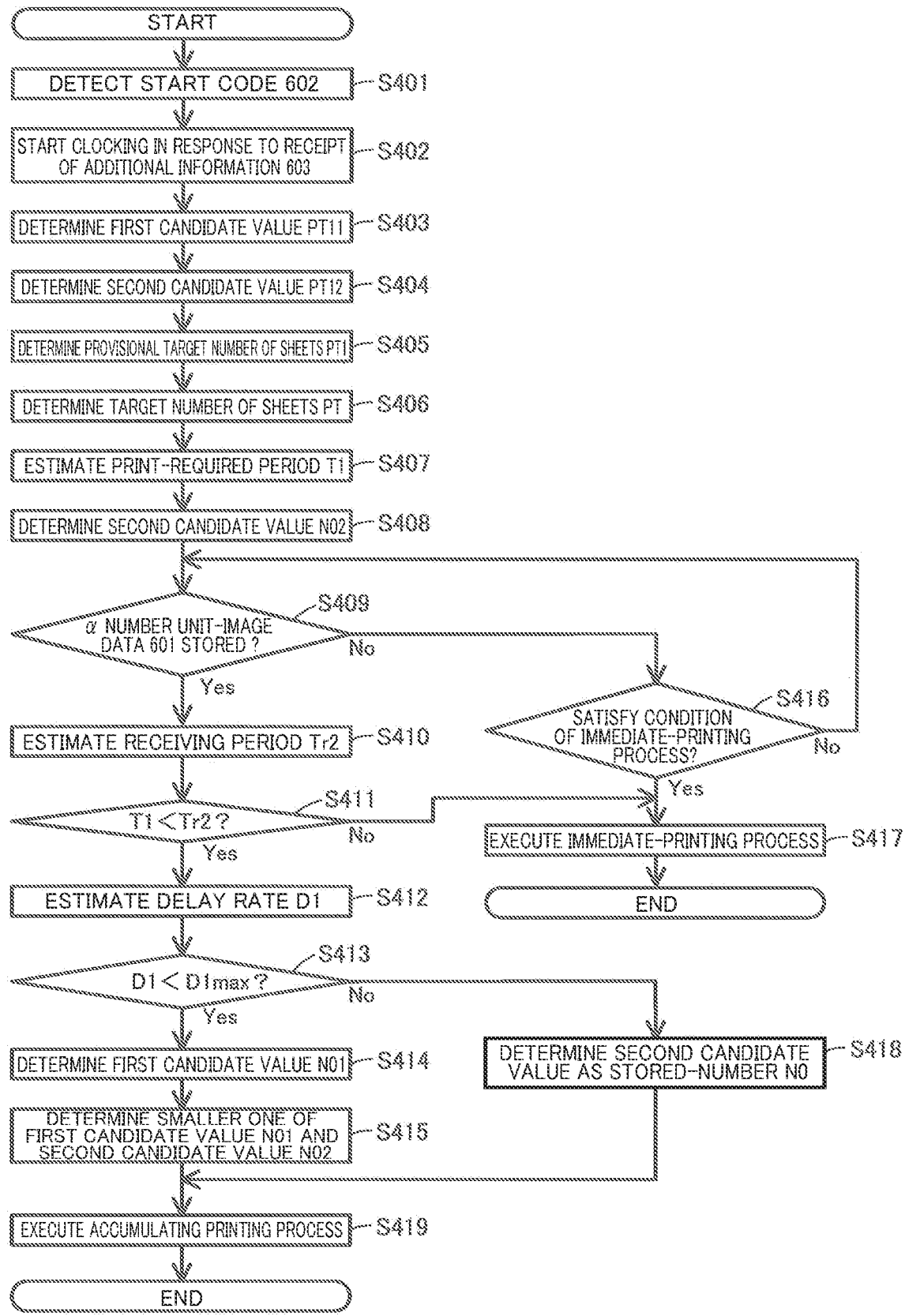
FIG. 4 is a flowchart representing a procedure of a printing process executed by the printing apparatus.

At S401 in FIG. 4, when the CPU 251 detects the start code 602 from the data in the RAM 253, the CPU 251 executes processes after S402 in response to recognition of the reception of the printing information 600.

At S402, the CPU 251 starts clocking by the timer 256 in accordance with completion of reception of the fixed-length additional information 603.

At S403, the CPU 251 determines a first candidate value PT11 of a provisional target number of sheets PT1. The provisional target number of sheets PT1 is a provisional value of a target number of sheets PT. The target number of sheets PT is determined at S406, and an example of image-number information. The target number of sheets PT is a target value of a number of the label sheets 162, in other words a number of the label images, which are continuously printed by the printing apparatus 100 without being temporary stopped in the accumulating-printing process. The first candidate value PT11 is a number of remaining label sheets 162 in the roll body 161. A conventional method is applicable as a method determining the number of remaining label sheets 162. For example, the CPU 251 can determine the number of remaining label sheets 162 by subtracting a number of the label sheets 162 of the roll body 161 which have been used from a total number of the label sheets 162 of the roll body 161 which is unused or new. Alternatively, the CPU 251 can estimate the remaining number of label sheets 162 based on an outer diameter of the roll body 161, a thickness of the continuously-fed paper S, and the pitch L1.

At S404, the CPU 251 determines a second candidate value PT12 of the provisional target number of sheets PT1. To determine the second candidate value PT12, the CPU 251 obtains information indicating the existence or nonexistence of the perforation, the width W1, the quality of paper of the continuously-fed paper S and the FPOT priority from the additional information 603 in the RAM 253.

As illustrated in FIG. 5, an ease-of-tearing table 2541 of the continuously-fed paper S is previously stored in the EEPROM 254. Information indicating degrees of ease of tearing of the continuously-fed paper S, which will be referred to as simply "ease of tearing" below, respectively corresponding to combinations of the width W1 and the quality of paper of the continuously-fed paper S is recorded in the ease-of-tearing table 2541. In the embodiment in FIG. 5, in a case where the width W1 is a first value (for example, less than 50.8 mm) and the information of the quality of paper of the continuously-fed paper S is "soft", "easy-to-tear" is recorded as the ease of tearing. In a case where the width W1 is a second value (for example, equal to or greater than 76.2 mm) and the quality of paper of the continuously-fed paper S is "hard", "hard-to-tear" is recorded as the ease-of-tearing.

As illustrated in FIG. 5, a second-candidate-value table 2542 is further stored in the EEPROM 254 previously. The second candidate values PT12 respectively corresponding to combinations of the ease of rearing of the continuously-fed paper S and the FPOT priority are recorded in the second-candidate-value table 2542. In the embodiment in FIG. 5, in a case where the ease of tearing is "easy-to-tear" and the FPOT priority is "low", a first value of the second candidate value PT12 (for example, five hundred label sheets) is recorded. In a case where the ease of tearing is "hard-to-tear" and the FPOT priority is "high", a second value of the second candidate value PT12 (for example, one hundred label sheets) is recorded. In a case where the ease of tearing is "normal-to-tear" and the FPOT priority is "middle", a third value of the second candidate value PT12 (for example, three hundred label sheets) is recorded.

In the case where the ease of tearing is "easy-to-tear", that is, the continuously-fed paper S is easily torn and the FPOT priority is "low", that is, the user does not place great importance on the FPOT priority, the user intends to start printing after the printing apparatus 100 accumulates the plurality of pieces of the unit-image data 601 in large in the image buffer 2531. As a result, in this case, a relatively large value of the second candidate value PT12 is recorded in the second-candidate-value table 2542.

At S404 in FIG. 4, in a case where the CPU 251 obtains the existence or nonexistence of the perforation which indicates "non-existence", the CPU 251 further obtains the ease of tearing corresponding to the combination of the obtained width W1 and the obtained quality of paper of the continuously-fed paper S from the ease-of-tearing table 2541. At S404, in a case where the CPU 251 obtains the existence or nonexistence of the perforation which indicates "existence", the CPU 251 obtains the ease of tearing which indicates "easy-to-tear" regardless of the combination of the obtained width W1 and the obtained quality of paper of the continuously-fed paper S. At S404, the CPU 251 further obtains, from the second-candidate-value table 2542, the second candidate value PT12 corresponding to the combination of information of the obtained ease of tearing and information of the obtained FPOT priority.

At S405, the CPU 251 determines, as the provisional target number of sheets PT1, the smaller one of the first candidate value PT11 determined at S403 and the second candidate value PT12 determined at S404.

At S406, the CPU 251 determines the target number of sheets PT based on the provisional target number of sheets PT1. As illustrated in FIG. 5, a first-candidate-value table 2543 (an example of a table) is further stored in the EEPROM 254. A first candidate value N01 of the stored-number N0 corresponding to the combination of a delay rate D1 (%) and the target number of sheets PT is recorded in the first-candidate-value table 2543. The delay rate D1 is a value obtained by multiplying a calculated value, which is calculated by dividing a print-requirement period T1 by a receiving period Tr2, by 100. The receiving period Tr2 is an example of a second period of time, and is a period of time which is required to receive a single piece of unit-image data 601 for the printing apparatus 100. The print-requirement period T1 is an example of a first period of time, and is a period of time which is required to print a single label image represented by a single piece of unit-image data 601 for the printing apparatus 100. In the embodiment in FIG. 5, the delay rate D1 is recorded from 1(%) to 100(%) in 1% steps. The target number of sheets PT is recorded from 100 sheets to 2000 sheets in 100 sheets steps. As a matter of convenience, illustrations of the large number of the delay rate D1 and the target number of sheets PT are dispensed with. The stored-number N0 is the number of the pieces of the unit-image data 601 temporary stored firstly into the image buffer 2531 after the start of the reception of the printing information 600. In the embodiment in FIG. 5, two is set to the first candidate value N01 of the stored-number N0 corresponding to the combination of 1(%) of the delay rate D1 and 100 sheets of the target number of sheets PT. Eleven is set to the first candidate value N01 corresponding to the combination of 2(%) of the delay rate D1 and 500 sheets of the target number of sheets PT.

The provisional target number of sheets PT1 determined at S405 is not always coincide with any one of the target number of sheets PT in the first-candidate-value table 2543. At S406, the CPU 251 selects, as the target number of sheets PT, the largest value of values of the target number of sheets PT which are less than the provisional target number of sheets PT1 in the first-candidate-value table 2543.

At S407, the CPU 251 estimates the print-requirement period T1 of each of the plurality of pieces of the unit-image data 601 based on the printing information 600. The CPU 251 obtains the conveyance speed V1 and the pitch L1 from the additional information 603 in the RAM 253. The CPU 251 further sets the print-requirement period T1 to a value calculated by dividing the pitch L1 by the conveyance speed V1.

At S408, the CPU 251 determines based on the printing information 600 and the like, as a second candidate value N02 of the stored-number N0 determined at S415 or S418, the maximum stored-number N0max of the plurality of pieces of the unit-image data 601 which is capable of being stored in the image buffer 2531. The CPU 251 sets the maximum stored-number N0max, namely the second candidate value N02, to a value calculated by dividing the size B1 of the image buffer 2531 described in the controlling program and the like by an obtained data size. The obtained data size is a size of data of each of the plurality of pieces of the unit-image data 601 calculated based on the width W1, the height H1, and the resolutions Rh, Rv in the RAM 253. It is noted that the size B1 of the image buffer 2531 corresponds to an amount of an area in which the plurality of pieces of the unit-image data 601 are stored in the RAM 253, and the obtained data size corresponds to an amount of each of the plurality of pieces of the unit-image data 601.

At S409, the CPU 251 determines whether or not a number of pieces of the unit-image data 601 are stored in the image buffer 2531. The number α is previously determined. The number α may be determined suitably, for example, the number α is three. When it is determined NO at S409, the CPU 251 executes a process of S416 which will be described below. When it is determined YES ad S409, the CPU 251 executes a process of S410.

At S410, the CPU 251 estimates the receiving period Tr2 of each of the plurality of pieces of the unit-image data 601. The CPU 251 obtains the period of time, clocked by the timer 256, elapsed from S402 in response to start of the process of S410. The CPU 251 sets the receiving period Tr2 to a value calculated by dividing the period of elapsed time by the number α.

At S411, the CPU 251 determines whether or not the print-requirement period T1 is less than the receiving period Tr2. When it is determined NO at S411, the CPU 251 executes a process of S417. When it is determined YES at S411, the CPU 251 executes a process of S412.

At S412, the CPU 251 estimates the delay rate D1 of the unit-image data 601. The CPU 251 sets the delay rate D1 to a value calculated by multiplying a value, which is calculated by dividing the print-requirement period T1 by the receiving period Tr2, by 100.

In a case where the estimated delay rate D1 is too large, the first candidate value N01 of the stored-number N0 corresponding to the large delay rate D1 is not recorded in the first-candidate-value table 2543 (see FIG. 5). At S413, the CPU 251 obtains the maximum delay rate D1 corresponding to the target number of sheets PT selected at S406 in the first-candidate-value table 2543 (which will be referred to as D1$max$). At S413, the CPU 251 determines whether or not the delay rate D1 estimated at S412 is less than D1$max$. When it is determined NO at S413, the CPU 251 executes a process of S418. When it is determined YES at S413, the CPU 251 executes a process of S414.

At S414, the CPU 251 determines the first candidate value N01 of the stored-number N0. The CPU 251 obtains, from the first-candidate-value table 2543, the first candidate value N01 corresponding to the combination of the estimated delay rate D1 and the target number of sheets PT selected at S406.

At S415, the CPU 251 determines, as the stored-number N0, the smaller one of the first candidate value N01 and the second candidate value N02.

At S416, the CPU 251 determines whether an execution condition of the immediate-printing process is satisfied or not. One example of the execution condition is a case where the image buffer 2531 becomes in a full state before the number α pieces of the unit-image data 601 is stored in the image buffer 2531. Another example of the execution condition is that the CPU 251 detects the end code 604 of the printing information 600 before the number α pieces of the unit-image data 601 is stored in the image buffer 2531. When it is determined NO at S416, the CPU 251 returns to S409. When it is determined YES at S416, the CPU 251 executes a process of S417.

At S417, the CPU 251 executes the immediate-printing process. In the immediate-printing process, the CPU 251 firstly executes a start-position positioning process on condition that a first piece of the unit-image data 601 of the plurality of pieces of the unit-image data 601 is stored into the image buffer 2531. In the start-position positioning process, the CPU 251 rotates the holder 160 by outputting control signals to the motor 231 and rotates the driving rollers 181, 221 by outputting control signals to the motor 232 so as to move a print-start-position on the continuously-fed paper S to a position right below the print head 210.

It is noted that, the start-position positioning process may not be executed at S417. More specifically, the start-position positioning process may be executed after the process of S401.

At S417, the CPU 251 further rotates the holder 160 and the driving rollers 181, 221 by the control signals so as to convey the continuously-fed paper S to the conveying direction 8A at the conveyance speed V1. The CPU 251 outputs the first piece of unit-image data 601 of the plurality of pieces of the unit-image data 601 in the image buffer 2531 to a driving circuit, which is not illustrated, of the print head 210. The driving circuit generates driving signals of the print head 210 based on the input first piece of the unit-image data 601 and outputs the generated driving signals to the print head 210. The CPU 251 controls, by the driving signals, the print head 210 to eject ink droplets on the label sheets 162 conveyed right below in the conveying direction 8A.

After the process of S417, the CPU 251 prints images, similar to S417, based on the plurality of pieces of the unit-image data 601 successively stored in the image buffer 2531 on the label sheets 162 until the CPU 251 detects the end code 604 of the printing information 600.

At S418, the CPU 251 determines the second candidate value N02 as the stored-number N0.

Following the process of S415 or the process of S418, the CPU 251 executes the accumulating-printing process at S419. In the accumulating-printing process, the CPU 251 executes the start-position positioning process when the stored-number N0 of pieces of the unit-image data 601 are stored into the image buffer 2531. At S419, the CPU 251 further prints the label image, similar to S417, based on the first piece of the unit-image data 601 of the plurality of pieces of the unit-image data 601 in the image buffer 2531 on the label sheets 162 while conveying the continuously-fed paper S in the conveying direction 8A at the conveyance speed V1. After the start of the execution of the process of S419, the CPU 251 successively prints the label images, similar to S417, on the label sheets 162 based on the plurality of pieces of the unit-image data 601 stored in the image buffer 2531 until the CPU 251 detects the end code 604 of the printing information 600.

Figure 6A:
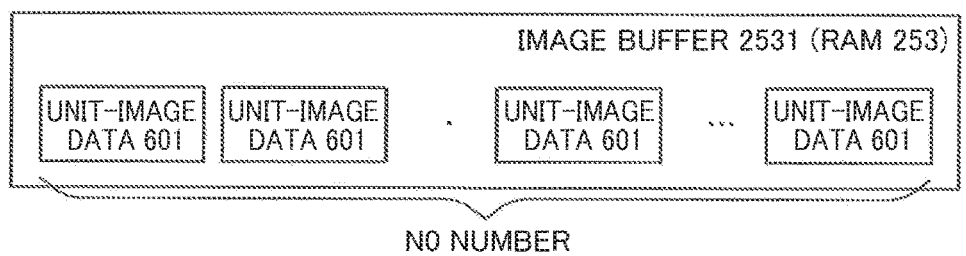
FIG. 6A is a schematic view illustrating an example of an accumulating-printing process.

According to the printing process, when it is determined that the execution condition of the immediate-printing process is not satisfied (NO at S416), the accumulating-printing process (S419) is started when the stored-number N0 of pieces of the unit-image data 601 are accumulated in the image buffer 2531 after the printing information 600 is received, as illustrated in FIG. 6A.

Figure 6B:
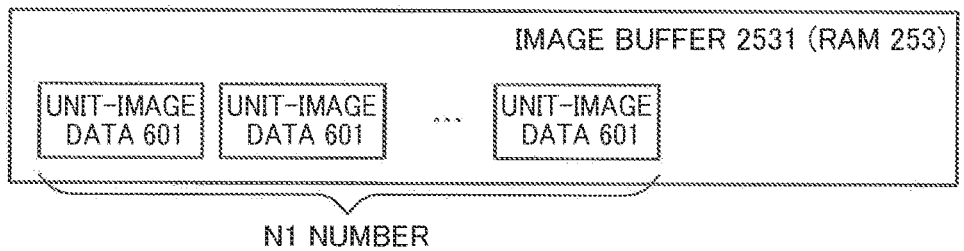
FIG. 6B is a schematic view illustrating another example of an accumulating-printing process.
Figure 6C:
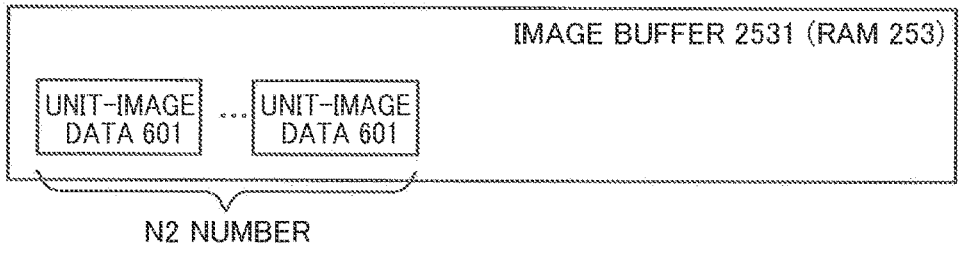
FIG. 6C is a schematic view illustrating another example of an accumulating-printing process.

In the accumulating-printing process, as illustrated in FIG. 6B, a stored-number N1 of pieces of the unit-image data 601 are newly accumulated in the image buffer 2531 before printing of the stored-number N0 of label images based on the stored-number N0 of pieces of the unit-image data 601 on the stored-number N0 of label sheets 162 is completed. As illustrated in FIG. 6C, a stored-number N2 of pieces of the unit-image data 601 are newly accumulated in the image buffer 2531 before printing of the stored-number N1 of label images based on the stored-number N1 of pieces of the unit-image data 601 on the stored-number N1 of label sheets 162 is completed. Here, the number N1 is calculated by multiplying the number N0 by D, (N1=N0×D, D=D1/100) and the number N2 is calculated by multiplying the number N0 by the square of D (N2=N1×D=N0×D$^2$). After that, in the accumulating-printing process, the CPU 251 can execute continuous printing on the the label sheets 162 without stopping conveyance of the continuously-fed paper S until the stored-number Ni (i is a natural number) becomes less than one. That is, the CPU 251 can execute continuous printing on the label sheets 162, a total number of which is the sum from the stored-number N0 to the stored-number Ni.

Operations and Effects of Printing Apparatus

The CPU 251 executes the accumulating-printing process in which the CPU 251 determines the stored-number N0 based on the print-requirement period T1 and the receiving period Tr2, and starts the continuous printing after the stored-number N0 of pieces of the unit-image data 601 are stored in the image buffer 2531. Accordingly, the CPU 251 can start the continuous printing, even when a delay of transmission of the plurality of pieces of the unit-image data 601 to the RAM 253 occurs. As a result, it is possible to suppress the shortage of the unit-image data 601 in the RAM 253, namely suppress a buffer underrun, and it is possible to suppress conveyance stop of the continuously-fed paper S.

In the printing process, since the stored-number N0 is determined based on the delay rate D1, it is possible to more suppress the shortage of the unit-image data 601 in the RAM 253. As a result, it is possible to more suppress the conveyance stop of the continuously-fed paper S.

In the printing process, the first-candidate-value table 2543 previously stored in the EEPROM 254 is used so as to determine the stored-number N0. Accordingly, it is possible to suppress computation loads of the CPU 251.

In the printing process, the target number of sheets PT is changed in accordance with the quality of the continuously-fed paper S and the existence or nonexistence of the perforation. That is, it is possible to suppress the shortage of the unit-image data 601 in the RAM 253 in accordance with kinds of the continuously-fed paper S.

In the printing process, the target number of sheets PT is changed in accordance with the FPOT priority designated through the user IF 302. That is, it is possible to suppress the shortage of the unit-image data 601 in the RAM 253 in accordance with the FPOT priority. As a result, in a case where the FPOT priority is "high", the user can obtain the first label sheet on which the label image has been printed of the continuously-fed paper S early.

In the printing process, in a case where the print-requirement period T1 is equal to or greater than the receiving period Tr2, the delay of the transmission of the plurality of pieces of unit-image data 601 to the RAM 253 does not substantially occurs. Accordingly, the CPU 251 executes the immediate-printing process without waiting completion of storing the stored-number N0 of pieces of the unit-image data 601 into the RAM 253 (S417 in FIG. 4). That is, the printing on the label sheets 162 is started early.

Modifications

In the present embodiment, the CPU 251 determines the first candidate value N01 of the stored-number N0 by using the first-candidate-value table 2543. However, the present disclosure is not limited to this. The CPU 251 may determine the first candidate value N01 by computations.

In the present embodiment, the stored-number N0 is determined based on the delay rate D1 (D1=T1×100/Tr2). However, the present disclosure is not limited to this. The stored-number N0 may be determined based on a difference between the receiving period Tr2 and the print-requirement period T1. Alternatively, the stored-number N0 may be determined based on parameters related to the delay rate D1 or the difference between the receiving period Tr2 and the print-requirement period T1, the parameters are not identical with the delay rate D1 or the difference between the receiving period Tr2 and the print-requirement period T1 themselves.

In the present embodiment, the printing apparatus 100 receives the printing information 600 from the information processing apparatus 300. However, the present disclosure is not limited to this. The printing apparatus 100 may generate the printing information 600 within the printing apparatus 100 by itself. In this case, the printing apparatus 100 successively generates the plurality of pieces of the unit-image data 601, and successively accumulates the plurality of pieces of the unit-image data 601 in the image buffer 2531. Accordingly, there is a possibility that a processing delay of encoding bitmap data occurs depending on a data size of the plurality of pieces of the unit-image data 601. Since there are possibilities of occurring of the stop of the printing or the return to the print start position due to the processing delay, the printing apparatus 100 may execute the printing process in FIG. 4 when the printing apparatus 100 generates the plurality of pieces of the unit-image data 601 within the printing apparatus 100 by itself.

In the present embodiment, the printing apparatus 100 obtains the medium information related to the continuously-fed paper S from the information processing apparatus 300. However, the present disclosure is not limited to this. The printing apparatus 100 may obtain the medium information from the operation panel 130. Moreover, in a case where the roll body 161 includes an IC chip capable of storing the medium information, the printing apparatus 100 may obtain the medium information from the IC chip.

What is claimed is:

1. A printing apparatus, comprising:
   a conveying mechanism configured to convey a continuously-fed paper in a conveying direction;
   a print head;
   a memory; and
   a controller configured to:
     obtain printing information including a plurality of pieces of the unit-image data, pitch information indicating a plurality of pitches, along the conveying direction, of a plurality of unit-images respectively corresponding to the plurality of pieces of the unit-image data printed on the continuously-fed paper, and speed information indicating a speed of the continuously-fed paper conveyed by the conveying mechanism;
     store the plurality of pieces of the unit-image data into the memory;
     determine, based on the pitch information and the speed information, a first period of time required to print a predetermined number of unit-images on the continuously-fed paper;
     determine a second period of time required to store the predetermined number of pieces of the unit-image data respectively corresponding to the predetermined number of unit-images into the memory;
     determine, based on the first period of time and the second period of time, a stored-number which is a number of pieces of the unit-image data to be stored into the memory; and
     start printing the plurality of unit-images on the continuously-fed paper based on the plurality of pieces of the unit-image data stored in the memory when the stored-number of pieces of the unit-image data is stored into the memory.

2. The printing apparatus according to claim 1 wherein the controller is configured to:
   determine delay information related to a ratio of the second period of time with respect to the first period of time; and
   determine the stored-number to be stored into the memory by referring to the determined delay information.

3. The printing apparatus according to claim 2 wherein the memory stores a table in which the stored-number corresponding to a combination of image-number information indicating a possible number of continuous printing of the unit-images and the delay information is determined;
wherein the controller is configured to:
   determine the image-number information based on a volume of an area in the memory in which the plurality of pieces of the unit-images are stored and a volume of each of the plurality of pieces of unit-images; and obtain the stored-number corresponding to the determined image-number information and the determined delay information from the table.

4. The printing apparatus according to claim 2 wherein the controller is configured to:
   determine image-number information indicating a possible number of continuous printing of the unit-images based on a volume of an area in the memory in which the plurality of pieces of the unit-images are stored and a volume of each of the plurality of pieces of unit-images; and
   determine the stored-number by computations based on the determined image-number information and the determined delay information.

5. The printing apparatus according to claim 3, wherein the controller is configured to:
   obtain medium information of the continuously-fed paper; and
   determine the image-number information based on the medium information.

6. The printing apparatus according to claim 3, further comprising a user interface,
   wherein the controller is configured to determine the image-number information based on conditions designated through the user interface.

7. The printing apparatus according to claim 2,
   wherein the controller is configured to:
   determine the delay information on condition that the second period of time is greater than the first period of time; and
   start printing on the continuously-fed paper by the print head, without determining the delay information, based on the unit-image data stored in the memory when a piece of unit-image data corresponding to a unit-image which is to be first printed is stored into the memory, on condition that the second period of time is equal to or less than the first period of time.

\* \* \* \* \*